(12) United States Patent
Shigeta

(10) Patent No.: US 9,435,667 B2
(45) Date of Patent: Sep. 6, 2016

(54) POSITION DETECTING APPARATUS, AND LENS APPARATUS AND IMAGE PICKUP APPARATUS INCLUDING THE POSITION DETECTING APPARATUS

(71) Applicant: CANON KABUSHIKI KAISHA, Tokyo (JP)

(72) Inventor: Junji Shigeta, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 14/527,817

(22) Filed: Oct. 30, 2014

(65) Prior Publication Data

US 2015/0116571 A1    Apr. 30, 2015

(30) Foreign Application Priority Data

Oct. 30, 2013  (JP) .................. 2013-224847

(51) Int. Cl.
| | |
|---|---|
| *G01D 5/347* | (2006.01) |
| *G01B 11/14* | (2006.01) |
| *H04N 5/232* | (2006.01) |
| *G01D 5/244* | (2006.01) |

(52) U.S. Cl.
CPC ........... *G01D 5/34776* (2013.01); *G01B 11/14* (2013.01); *G01D 5/24461* (2013.01); *G01D 5/34792* (2013.01); *H04N 5/232* (2013.01)

(58) Field of Classification Search
CPC .. G01D 5/347; G01D 5/3473; G01D 5/2455; G01D 5/2457; G01D 5/2497
USPC .................. 250/231.13, 221, 214 R, 208.1; 341/11–13
See application file for complete search history.

(56) References Cited

U.S. PATENT DOCUMENTS 5,260,568 A * 11/1993 Ieki .................. G01D 5/2455
250/231.18

FOREIGN PATENT DOCUMENTS

| JP | 5-45151 A | 2/1993 |
|---|---|---|
| JP | 8-304113 A | 11/1996 |
| JP | 2003-240605 A | 8/2003 |
| JP | 2008-116343 A | 5/2008 |
| JP | 2012-58165 A | 3/2012 |
| JP | 2012-173168 A | 9/2012 |
| JP | 2013-246054 A | 12/2013 |

\* cited by examiner

*Primary Examiner* — Que T Le
(74) *Attorney, Agent, or Firm* — Rossi, Kimms & McDowell LLP

(57) ABSTRACT

A position detector, includes: a scale having pattern arrays formed in different cycles in a movement direction an obtaining unit which obtains signals in accordance with the pattern arrays; a first deriving unit which derives a temporal position of the scale relative to the obtaining unit based on the signals; a second deriving unit which derives a displacement amount of the scale relative to the obtaining unit based on one or more signals of the signals; and a determinates which determines a determined position of the scale relative to the obtaining unit based on the temporal position and the displacement amount, wherein the determinator determines the determined position based on a result of comparison between a difference between first and second temporal positions respectively calculated by the first and second deriving units at first and second positions and a displacement amount from the first position to the second position.

9 Claims, 9 Drawing Sheets

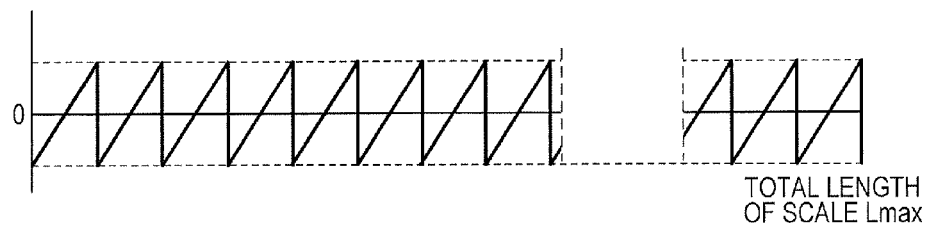
FIG. 6A Atan1
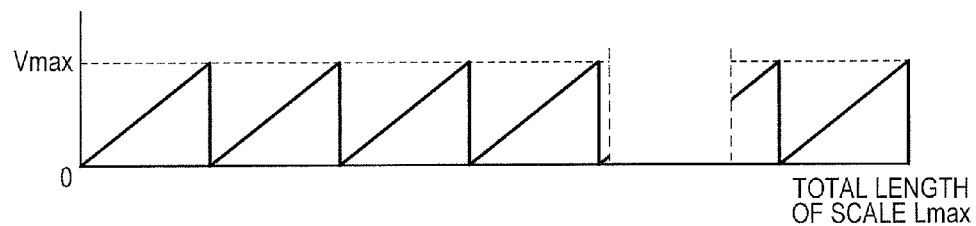
FIG. 6B Inc1
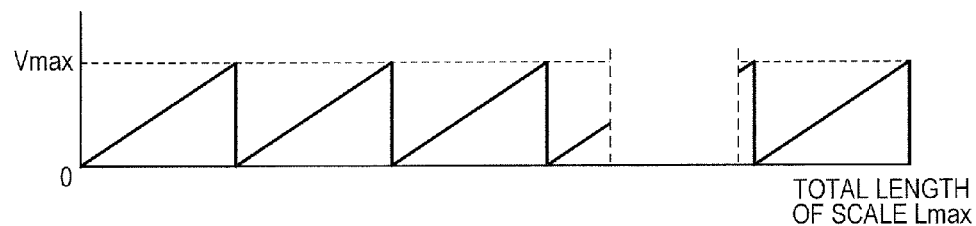
FIG. 6C Inc2
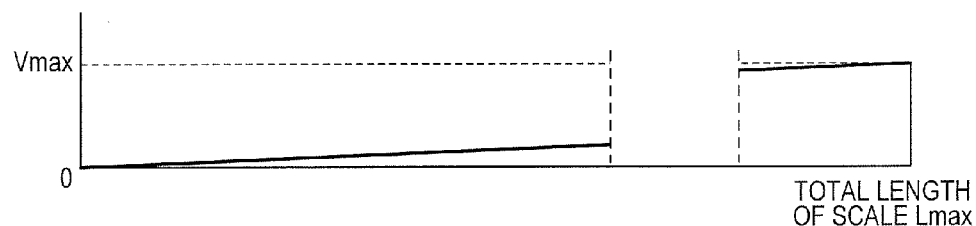
FIG. 6D Pv1

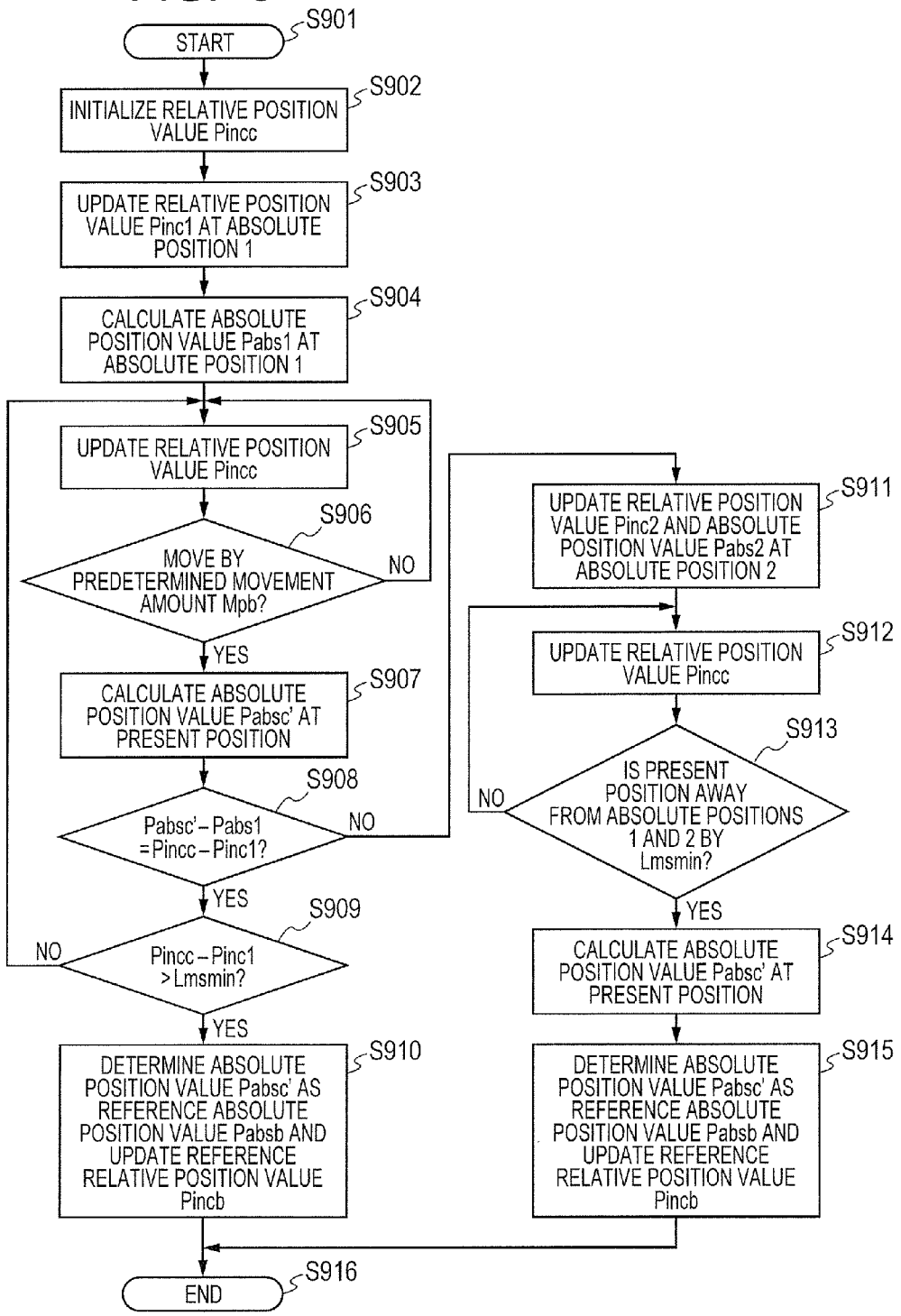

POSITION DETECTING APPARATUS, AND LENS APPARATUS AND IMAGE PICKUP APPARATUS INCLUDING THE POSITION DETECTING APPARATUS

BACKGROUND OF THE INVENTION

1. Field of the Invention

The present invention relates to a position detecting apparatus configured to detect a position of a movable member, and to a lens apparatus and an image pickup apparatus including the position detecting apparatus.

2. Description of the Related Art

As an apparatus for measuring a distance of movement of an object, besides an incremental encoder for measuring a distance of relative movement, there is hitherto known an absolute encoder capable of detecting an absolute position.

Japanese Patent Application Laid-open No. H08-304113 discloses a Vernier type absolute encoder. The Vernier type absolute encoder disclosed in Japanese Patent Application Laid-open No. H08-304113 has a configuration including at least two grid patterns having different pitches on a track. Based on a slight shift between detected signals, which is generated due to a difference in pitch between the grid patterns, a position in a section over which the Vernier type absolute encoder circulates once is identified (hereinafter also referred to as "absolute position detection" or "absolute position calculation").

Japanese Patent Application Laid-open No. H05-45151 discloses timing of switching to an absolute counting operation in the Vernier type absolute encoder. The Vernier type absolute encoder has a configuration in which track patterns are formed at smaller pitches and at larger pitches. As the timing of switching to the absolute counting operation based on the tracks described above, when a speed is lowered to a speed at which erroneous detection does not occur in an incremental measurement at the smaller pitches, an operation of the Vernier type absolute encoder is switched to the absolute counting operation.

However, the absolute encoder disclosed in Japanese Patent Application Laid-open No. H08-304113 has the following problem. In the case where motes and scratches are present on a scale, an absolute position is calculated based on an erroneous detection signal. As a result, there arises a problem in that a correct absolute position cannot be calculated.

Further, the absolute encoder disclosed in Japanese Patent Application Laid-open No. H05-45151 has the following problem. In the case where motes and scratches are present on a scale at a position at which the speed is lowered so that erroneous detection does not occur in incremental measurement with fine pitches, an erroneous detection signal is detected. As a result, an absolute position is also calculated based on the erroneous detection signal.

SUMMARY OF THE INVENTION

It is an object of the present invention to provide a Vernier type position detecting apparatus having high reliability, which is capable of preventing erroneous absolute position calculation even in the case where motes and scratches are present on a track.

In order to achieve the above-mentioned object, a position detecting apparatus according to one embodiment of the present invention includes: a scale including a plurality of pattern arrays formed in different cycles in a movement direction; an obtaining unit configured to obtain a plurality of signals in accordance with the plurality of pattern arrays; a first deriving unit configured to derive a temporal position of the scale with respect to the obtaining unit, based on the plurality of signals; a second deriving unit configured to derive a displacement amount of the seals with respect to the obtaining unit based on one or more signals of the plurality of signals; and a determinator configured to determine a determined position of the scale with respect to the obtaining unit based on the temporal position and the displacement amount, wherein the determinator determines the determined position based on a result of comparison between a difference between a first temporal position calculated by the first deriving unit at a first position and a second temporal position calculated by the first deriving unit at a second position and a displacement amount derived by the second deriving unit from the first position to the second position.

According to one embodiment of the present invention, the position detecting apparatus having high reliability can be provided, which is capable of preventing erroneous absolute position calculation even in the case where motes and scratches are present on a track in the Vernier type position detecting apparatus.

Further features of the present invention will become apparent from the following description of exemplary embodiments with reference to the attached drawings.

BRIEF DESCRIPTION OF THE DRAWINGS

FIG. 6A is a graph showing first and second relative position signals and a Vernier signal.

FIG. 6B is a graph showing first and second relative position signals and a Vernier signal.

FIG. 6C is a graph showing first and second relative position signals and a Vernier signal.

FIG. 6D is a graph showing first and second relative position signals and a Vernier signal.

FIG. 9 is a flowchart of absolute position determination according to the first embodiment.

DESCRIPTION OF THE EMBODIMENTS

In the following, exemplary embodiments of the present invention are described in detail with reference to the accompanying drawings.

First Embodiment

In the following, a position detecting apparatus according to a first embodiment of the present invention is described with reference to FIG. 1.

Figure 1:
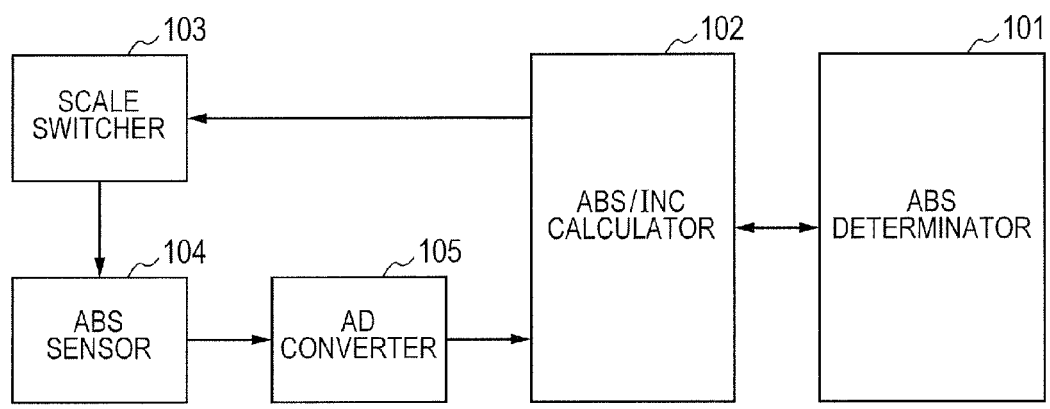
FIG. 1 is a configuration block diagram according to a first embodiment of the present invention.

FIG. 1 is a configuration block diagram according to the first embodiment. In FIG. 1, an ABS/INC calculator 102 is a calculator (first deriving unit and second deriving unit) for calculating, based on a signal obtained from an ABS sensor 104, an absolute position value Pabs (temporal position) that is a position (absolute position) calculated based on a signal obtained at a position of a movable member with respect to a predetermined reference position of a fixed member and a relative position value Pinc that is a displacement amount (relative position) from a certain position of the movable member with respect to the fixed member. A scale switcher 103 switches two types of signal outputs generated by two types of pattern arrays, which are sequentially output from the ABS sensor 104. The ABS sensor (obtaining unit) 104 is an absolute position sensor for outputting a signal for calculating an absolute position of the movable member with respect to the fixed member. An internal configuration and the output signals of the ABS sensor 104 are described later. An AD converter 105 is configured to convert an analog signal output from the ABS sensor 104 into a digital signal. An ABS determinator 101 (determinator) is configured to determine a present absolute position Pabsc based on the absolute position value Pads and the relative position value Pinc calculated by the ABS/IRC calculator 102. The ABS determinator 101 and the ABS/INC calculator 102 are configured in a single CPU, for example.

Next, an operation of this embodiment is described.

The ABS determinator 101 requests the ABS/INC calculator 102 to calculate the absolute position value Pabs. When receiving the absolute position calculation request from the ABS determinator 101, the ABS/INC calculator 132 issues a command to the scale switcher 103 so that signals corresponding to the two types of pattern arrays successively are output from the ABS sensor 104. The scale switcher 103 instructs the ABS sensor 104 to output two types of patterns of signals (described later) successively. The ABS sensor 104 outputs the signals corresponding to the two types of pattern arrays successively in accordance with the instruction from the scale switcher 103. The signals corresponding to the two types of pattern arrays output from the ABS sensor 104 are converted into digital signals by the AD converter 105 and output to the ABS/INC calculator 102. The ABS/INC calculator 102 calculates the absolute position value Pabs based on the signals corresponding to the two types of pattern arrays and outputs the absolute position value Pabs to the ABS determinator 101.

On the other hand, the ABS/INC calculator 102 issues a command to the scale switcher 103 so that a signal corresponding to a pattern array required for calculating the relative position value Pinc is output from the ABS sensor 104. The ABS/INC calculator 102 switches to the signal corresponding to the pattern array required for calculating the relative position value Pinc, and thereafter, calculates the relative position value Pinc based on the signal corresponding to the pattern array output from the AD converter 105 in the same way as the above and outputs the relative position value Pinc to the ABS determinator 101 periodically. The methods of calculating the absolute position and the relative position are described later. The ABS determinator 101 determines an absolute position based on the absolute position values Pabs and the relative position values Pinc at a plurality of positions. A method of determining the absolute position by the ABS determinator 101 is described later.

Next, the internal configuration and the output signals of the ABS sensor 104 are described below.

Figure 2:
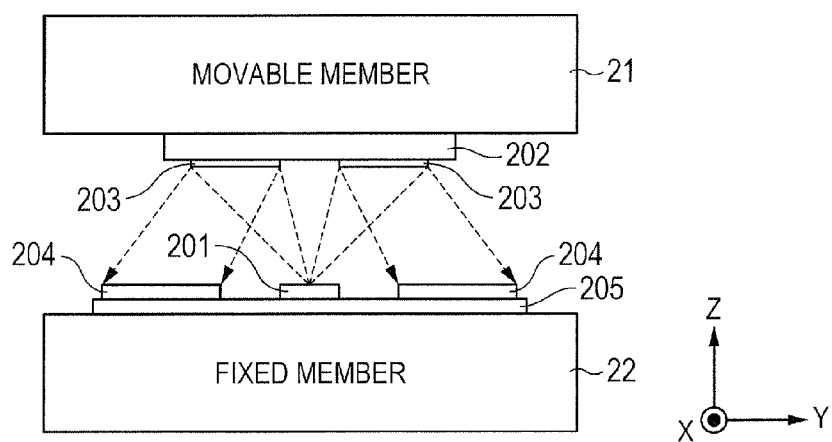
FIG. 2 is a sectional view of an ABS sensor.

FIG. 2 is a sectional view of the ABS sensor 104. in FIG. 2, a movable member 21 is a movable portion capable of moving in an X-axis direction which is vertical to a paper plane. A fixed member 22 is a member which serves as a reference of the absolute position of the movable member 21. A light source 201 is a light emitting unit, and is, for example, an LED. A scale unit 202 is a scale unit including two pattern arrays 203a and 203b having different numbers of slits provided at equal intervals over a total length. A light receiver 204a is a light receiver for receiving light which is emitted from the light source 201 and reflected by the pattern array 203a. Similarly, a light receiver 204b is a light receiver for receiving light which is emitted from the light source 201 and reflected by the pattern array 203b. The light receivers 204a and 204b are, for example, photodiode arrays. A signal processing circuit 205 is a signal processing circuit for outputting a signal corresponding to any one of the pattern arrays 203a and 203b in accordance with a switch-over signal from the scale switcher 103. In this embodiment, the configuration in which the scale unit 202 is provided to the movable member 21 and the light source 201 and the light receivers 204a and 204b are provided to the fixed member 22 is exemplified. However, the configuration is not limited thereto. The scale unit 202 only needs to foe provided to one of the fixed member 21 and the movable member 22, whereas the light source 201 and the light receivers 204a and 204b only need to be provided to the other of the fixed member 21 and the movable member 22. The same also applies to an embodiment described later.

Figure 3:
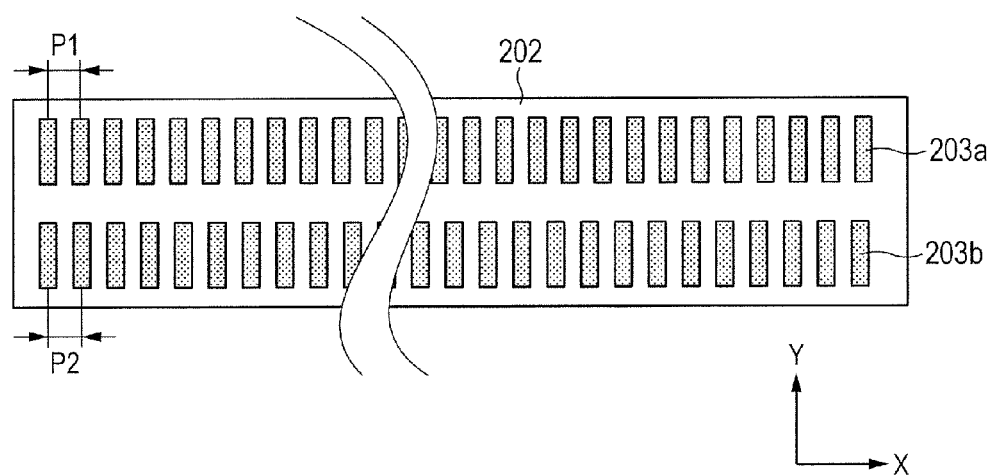
FIG. 3 is a plan view of a scale unit.

FIG. 3 is a plan view of the scale unit 202 according to the first embodiment. In FIG. 3, reflective type slit pattern arrays (reflective pattern arrays) are illustrated as an example. The scale unit 202 includes two pattern arrays, that is, the first pattern 203a and the second pattern 203b. The scale unit 202 is configured as follows. When the light emitted from the light source 201 enters reflective portions (black portions) of the pattern arrays 203a and 203b, the light is reflected to the respective light receivers 204a and 204b. The reflective portions of the first pattern 203a are formed at equal pitches P1. The reflective portions of the second pattern 203b are formed at equal pitches P2. In this embodiment, the pitch PI is determined so that forty reflective portions are formed over a total length Lmax of the scale, that is, to have forty cycles over the total length Lmax. The pitch P2 is determined so that thirty-nine reflective portions are formed over the total length Lmax of the scale, that is, to have thirty-nine cycles over the total length Lmax.

Figure 4:
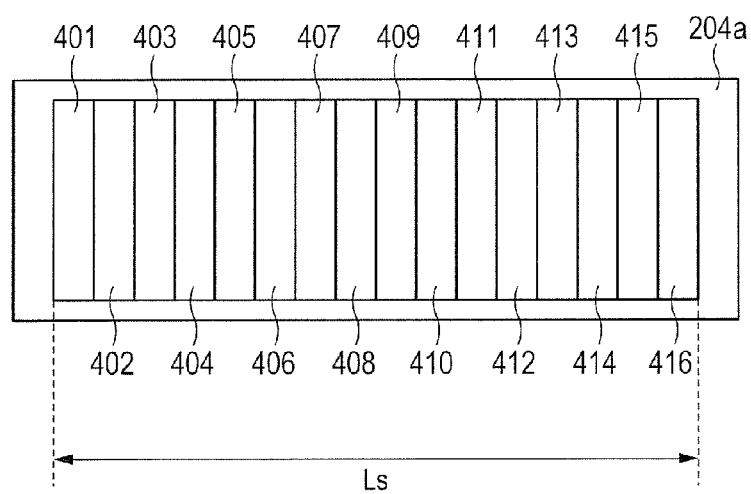
FIG. 4 is a plan view of a light receiver.

FIG. 4 is a plan view of the light receiver 204a. The light receiver 204b has the same configuration as that of the light receiver 204a. Sixteen photodiodes 401 to 416 are arranged on the light receiver 204a at equal intervals in a horizontal direction. The photodiodes 401, 405, 409, and 413 are electrically connected to each other. A group formed by the photodiodes 401, 405, 409, and 413 is referred to as "phase a". A group formed by the photodiodes 402, 406, 410, and 414 is referred to as "phase b". Similarly, a group formed by the photodiodes 403, 407, 411, and 415 is referred to as "phase c", and a group formed by the photodiodes 404, 408, 412, and 416 is referred to as "phase d". This embodiment is described based on the presupposition that a length for four photodiodes included in the light receiver 204a in a direction of arrangement of the photodiodes (for example, a distance from an end of the photodiode 401 to an end of the photodiode 404) is twice as large as the pitch P1 of the reflective portions of the first pattern 203a. An optical path length of light which is emitted from the light source 201 to the light receiver 204a becomes twice as large as an optical path length of light which is emitted from the light source 201 and reflected by the reflective portions of the first pattern 203a. Therefore, a width of the reflected light received by the light receiver 204a is twice as large as the width at the reflective portion. Therefore, the width for the four photodiodes included in the light receiver 204a corresponds to one cycle of the pattern of the first pattern 203a. Thus, the area of pattern arrays that can be read over a total length Is of the photodiodes of the light receiver 204a corresponds to four pattern cycles of the first pattern 203a.

When the light from the light source 201, which is reflected by the first pattern 203a, is received by the light receiver 204a, the phase-a, phase-b, phase-c, and phase-d photo-diode groups respectively output photo-electric currents corresponding to the received light amounts. With the movement of the scale unit 202 in the X-axis direction, the phase-a, phase-b, phase-c, and phase-d photodiode groups output the currents fluctuating in the following phase relationships. Specifically, with respect to the current in the phase a as a reference, the current fluctuates at 90° for the phase b, at 180° for the phase c, and at 270° for the phase d. The signal processing circuit 205 converts the output currents into voltages by a current-voltage converter. Next, the signal processing circuit 205 obtains a differential component between the phase a and the phase c and a differential component between the phase b and the phase d by a differential amplifier. Next, the signal processing circuit 205 generates, from the differential component between the phase a and the phase c and the differential component between the phase b and the phase d, a first A-phase displacement signal S1rA which is a A-phase displacement signal of the first pattern 203a and a first B-phase displacement signal S1rB which is a B-phase displacement signal thereof whose phase is shifted by 90° from the phase of the first A-phase displacement signal S1rA. In a similar manner, for the light received by the light receiver 204b, a second A-phase displacement signal S2rA and a second B-phase displacement signal S2rB which are respectively an A-phase displacement signal and a B-phase displacement signal of the second pattern 203b to are also generated.

The signal processing circuit 205 outputs any one of a set of the first A-phase displacement signal S1rA and the first B-phase displacement signal S1rB and a set of the second A-phase displacement signal S2rA and the second B-phase displacement signal S2rB in accordance with a switch-over signal from the scale switcher 103.

As described above, the ABS sensor 104 outputs any one of the set of the first A-phase displacement signal S1rA and the first B-phase displacement signal S1rB and the set of the second A-phase displacement signal S2rA and the second B-phase displacement signal S2rB in accordance with the switch-over signal from the scale switcher 103.

Next, the methods of calculating the absolute position and the relative position are described.

Figure 5:
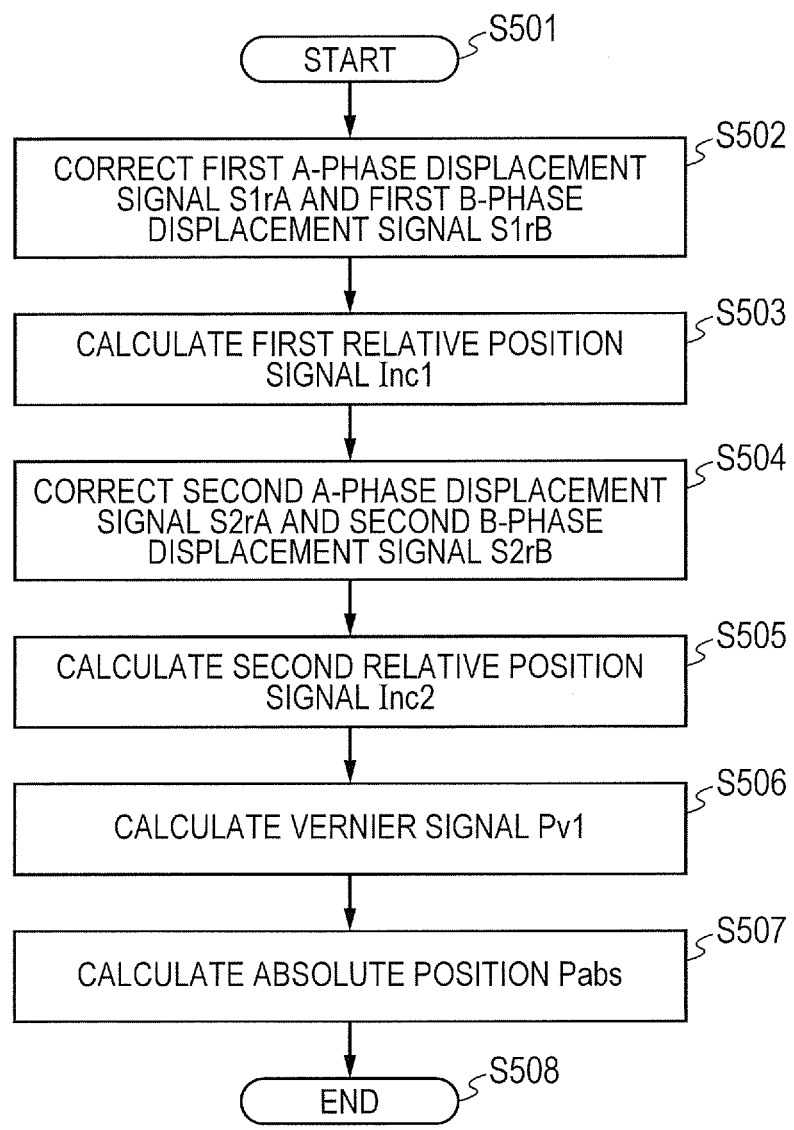
FIG. 5 is a flowchart of absolute position calculation.

The absolute position and the relative position are calculated by the ABS/INC calculator 102. FIG. 5 illustrates a flow of the absolute position calculation. In Step S501, the processing starts. Then, the processing proceeds to Step S502.

In Step S502, the first A-phase displacement signal S1rA and the first B-phase displacement signal S1rB are corrected.

The first A-phase displacement signal S1rA and the first B-phase displacement signal S1rB or the second A-phase displacement signal S2rA and the second B-phase displacement signal S2rB have different signal offsets or signal amplitudes in some cases. If the signals having different signal offsets or signal amplitudes are directly used for the absolute position calculation, an error may be generated in the calculated absolute position Pabs. Therefore, the signals are required to be corrected.

In this embodiment, as described above, the length for the four photodiodes included in the light receiver 204a in the direction of arrangement of the photodiodes (for example, the distance from the end of the photodiode 401 to the end of the photo-diode 404) is twice as large as the pitch P1 of the reflective portions of the first pattern 203a. Therefore, the first A-phase displacement signal S1rA and the first B-phase displacement signal S1rB are respectively expressed as Expressions (1) and (2) below.

$$S1rA: a1 \times \cos\theta + s1 \quad (1)$$

$$S1rB: a2 \times \sin\theta + s2 \quad (2)$$

In Expressions (1) and (2), symbol a1 is an amplitude of the first A-phase displacement signal S1rA and symbol s1 is an offset of the first A-phase displacement signal, symbol a2 is an amplitude of the first B-phase displacement signal S1rB and symbol s2 is an offset of the first B-phase displacement signal, and symbol θ is a phase of the signal. The first A-phase displacement signal S1rA has a maximum value of s1+a1, a minimum value of s1−a1, the signal amplitude of a1, and an average value of s1. Similarly, the second B-phase displacement signal S1rB has a maximum value of s2+a2, a minimum value of s2−a2, the signal amplitude of a2, and an average value of s2. By using the values described above, the first A-phase displacement signal S1rA and the first B-phase displacement signal S1rB respectively expressed by Expressions (1) and (2) are corrected. Then, a corrected first A-phase displacement signal S1cA and a corrected first B-phase displacement signal S1cB are expressed as Expressions (3) and (4) below.

$$S1cA: \{(a1 \times \cos\theta + s1) - s1\} \times a2 = a1 \times a2 \times \cos\theta \quad (3)$$

$$S1cB: \{(a2 \times \sin\theta + s2) - s2\} \times a1 = a1 \times a2 \times \sin\theta \quad (4)$$

As a result, the offsets of the first A-phase displacement signal S1rA and the first B-phase displacement signal S1rB are removed to obtain the first A-phase displacement signal S1cA and the first B-phase displacement signal S1cB having the same signal amplitude.

After the first A-phase displacement signal S1rA and the first B-phase displacement signal S1rB are corrected in Step S502 by the processing described above, the processing proceeds to Step S503.

In Step S503, by using the corrected first A-phase displacement signal S1cA and the corrected first B-phase displacement signal S1cB, an arctangent calculation is performed to calculate a signal Atan1 as shown in FIG. 6A. The first pattern 203a is a pattern which has forty cycles over the total length Lmax of the scale. Therefore, the signal Atan1 has eighty cycles over the total length of the scale. Next, the first relative position signal Inc1 having forty cycles over the total length of the scale and the wave height Vmax is calculated from the signal Atan1. Specifically, a gain is applied to the signal Atan1 so that the wave height of the signal Atan1 becomes Vmax/2. The signal level is offset so that the signal level becomes G when the phase of the first B-phase displacement signal S1rB is at 0°. Then, by adding Vmax/2 when the phase is in the range from 180°to 360°, the first relative position signal Inc1 is calculated. Therefore, the first relative position signal Inc1 becomes a saw tooth wave having forty cycles over the total length Lmax of the scale, as shown in FIG. 6B. Accordingly, the first relative position signal Inc1 corresponding to the phase of the first pattern 203a having the pitch P1 in one-by-one fashion is calculated by the ABS/INC calculator 102 (phase calculator).

In this case, each horizontal axis of FIGS. 6A, 6B, 6C, and 6D represents a position of the scale with respect to the total length Lmax, and each vertical axis thereof represents a signal level at that time.

After the first relative position signal Inc1 is calculated in Step S503, the processing proceeds to Step S504.

In Step S504, the second A-phase displacement signal S2rA and the first B-phase displacement signal S2rB are corrected.

The light receiver 204b has the same configuration as the light receiver 204a. Therefore, the length for four photodiodes included in the light receiver 204b in the direction of arrangement of the photodiodes (for example, the distance from the end of the photodiode 401 to the end of the photodiode 404) is twice as large as the pitch P1 of the reflective portions of the first pattern 203a. The pitch P1 of the reflective portions of the first pattern 203a and the pitch P2 of the reflective portions of the second pattern 203b are different from each other. Therefore, the length for four photodiodes included in the light receiver 204b in the direction of arrangement of the photodiodes (for example, the distance from the end of the photodiode 401 to the end of the photodiode 404) does not become twice as large as the pitch P2 of the reflective portions of the second pattern 203b. Therefore, the second A-phase displacement signal S2rA and the second B-phase displacement signal S2rB have a relationship in which the phase shift therebetween is not 90°.

Thus, the second A-phase displacement signal S2rA and the second B-phase displacement signal S2rB are respectively expressed by Expressions (5) and (6) below.

$$S2rA: b1 \times \cos\theta + t1 \quad (5)$$

$$S2rB: b2 \times \sin(\theta+\alpha) + t2 \quad (5)$$

In Expressions (5) and (6), symbol b1 is an amplitude of the second A-phase displacement signal S2rA and symbol t1 is an offset of the second A-phase displacement signal S2rA, symbol b2 is an amplitude of the second B-phase displacement signal S2rB and symbol t2 is an offset of the second B-phase displacement signal S2rB, symbol θ is a phase of the signal, and symbol α is a shift amount of the phase. When the second A-phase displacement signal S2rA and the second B-phase displacement signal S2rB are corrected in the same manner as in the processing performed in Step S502, a corrected second A-phase displacement signal S2cA' and a corrected second B-phase displacement signal S2cB' are expressed by Expressions (7) and (8) below.

$$S2cA': \{(b1 \times \cos\theta + t1) - t1\} \times b2 = b1 \times b2 \times \cos\theta \quad (7)$$

$$S2cB': \{(b2 \times \sin(\theta+\alpha) + t2) - t2\} \times b1 = b1 \times b2 \times \sin(\theta+\alpha) \quad (8)$$

As a result, the offset t1 of the second A-phase displacement signal S2rA and the offset t2 of the second B-phase displacement signal S2rB are removed to obtain the second A-phase displacement signal S2cA' and the second B-phase displacement signal S2cB' having the same signal amplitude.

Next, processing for setting a phase difference between the second A-phase displacement signal S2cA' and the second B-phase displacement signal S2cB' to 90° by using Expressions (7) and (8) is described below.

A difference between Expressions (7) and (8) and the sum of Expressions (7) and (8) are respectively expressed by Expressions (9) and (10) below.

$$b1 \times b2 \times (\sin(\theta+\alpha) - \cos\theta) = b1 \times b2 \times 2 \times \sin\{(\alpha+90)/2\} \times \cos\{\theta+(\alpha+90)/2\} \quad (9)$$

$$b1 \times b2 \times (\sin(\theta+\alpha) - \cos\theta) = b1 \times b2 \times 2 \times \cos\{(\alpha+90)/2\} \times \sin\{\theta+(\alpha+90)/2\} \quad (10)$$

The phase difference given by Expressions (9) and (10) becomes 90° by the calculations described above.

The amplitudes in Expressions (9) and (10) are different from each other. Therefore, the amplitudes are next corrected to calculate a second A-phase displacement signal S2cA and a second B-phase displacement signal S2cB having the same signal amplitude. Expression (9) is multiplied by $\cos\{(\alpha-90)/2\}$ which is a part of the amplitude in Expression (10), and Expression (10) is multiplied by $\sin\{(\alpha-90)/2\}$ which is a part of the amplitude in Expression (9). Then, Expressions (11) and (12) are obtained.

$$S2cA = b1 \times b2 \times 2 \times \sin\{(\alpha+90)/2\} \times \cos\{(\alpha-90)/2\} \times \cos\{\theta+(\alpha+90)/2\} \quad (11)$$

$$S2cB = b1 \times b2 \times 2 \times \sin\{(\alpha+90)/2\} \times \cos\{(\alpha-90)/2\} \times \sin\{\theta+(\alpha+90)/2\} \quad (12)$$

As a result, the offsets of the second A-phase displacement signal S2rA and the second B-phase displacement signal S2rB are removed so that the second A-phase displacement signal S2cA and the second B-phase displacement signal S2cB having the same signal amplitude are obtained.

After the second A-phase displacement signal S2rA and the second B-phase displacement signal S2rB are corrected In Step S504 by the processing described above, the processing proceeds to Step S505.

In Step S505, the same calculation as that performed in Step S503 is performed using the corrected second A-phase displacement signal S2cA and the corrected second B-phase displacement signal S2cB to calculate a second relative position signal Inc2. The second pattern 203b is a pattern array having thirty-nine cycles over the total length Lmax of the scale. Therefore, the second relative position signal Inc2 becomes a saw tooth wave having thirty-nine cycles over the total length Lmax of the scale, as shown in FIG. 6C. Accordingly, the second relative position signal Inc2 corresponding to the phase of the second pattern 203b having the pitch P2 in one-by-one fashion is calculated by the ABS/INC calculator 102 (phase calculator). The horizontal axis of FIGS. 6A, 6B, 6C, and 6D indicates the position on the total length Lmax of the scale, whereas the vertical axis indicates the signal level at the position.

After the second relative position signal Inc2 is calculated in Step S505, the processing proceeds to Step S506.

In Step S506, a difference between the first relative position signal Inc1 and the second relative position signal Inc2 is calculated, and when the difference is a negative value, Vmax is added, to thereby obtain a Vernier signal Pv1 is obtained as shown in FIG. 6D. In this case, the difference in cycle with respect to the total length Lmax between the first relative position signal Inc1 and the second relative position signal Inc2 is 1, and hence the Vernier signal Pv1 becomes a saw tooth wave of one cycle with respect to the total length Lmax.

After the Vernier signal Pv1 is calculated in Step S506, the processing proceeds to Step S507.

In Step S507, the absolute position value Pabs is calculated.

The signals S1rA, S1rB, S2rA, and S2rB each contain a noise component due to a disturbance and the like. Therefore, the first and second relative position signals Inc1 and Inc2 calculated from the signals S1rA, S1rB, S2rA, and S2rB also contain a noise component. The first relative position signal Inc1 and the second relative position signal Inc2 are not based on the signals S1rA, S1rB, S2rA, and S2rB that are obtained simultaneously, and hence there is a signal obtaining delay. In the case where the movable member 21 is moving during the signal obtaining delay time, a phase shift occurs in a signal. In order to correct an error component E caused by a noise component and a phase shift amount, the synchronism calculation of the Vernier signal Pv1 and the first relative position signal Inc1 is performed. As a result of the synchronism calculation, a signal synthesized through use of the Vernier signal Pv1 which is an upper-level signal and the first relative position signal inc1 which is a lower-level signal is calculated as a signal level Vabs representing the absolute position. The absolute position value Pabs is calculated from the signal level Vabs. A method of calculating the absolute position value Pabs from the signal level Vans is described later.

FIGS. 7A, 7B, 7C, and 7D show how the waveforms change by the synchronism calculation described above.

In FIGS. 7A, 7B, 7C, and 7D, the horizontal axis indicates the position on the total length Lmax of the scale, whereas the vertical axis indicates the signal level at the position on the total length Lmax. In addition, symbol Visas indicates the maximum value of the signal level, and symbol N1 indicates a cycle number of a region from a start point of the scale. The maximum cycle is defined as N1max. In this embodiment, the first pattern 203a has forty cycles over the total length Lmax of the scale. Therefore, N1max is 40, where N1 is a natural number ranging from 1 to 40.

Figure 7A:
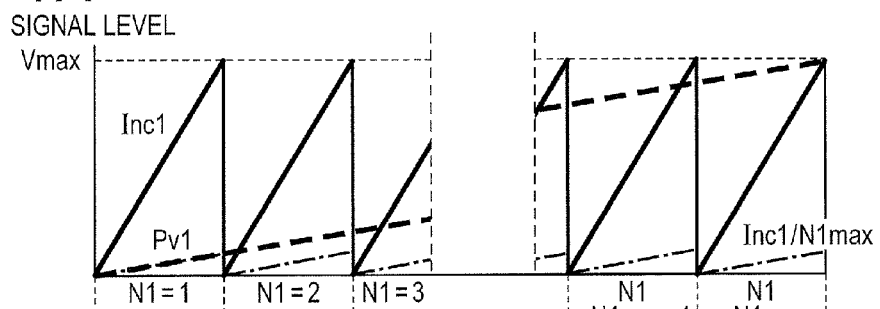
FIG. 7A is a graph showing a waveform change in synchronism calculation.
Figure 7B:
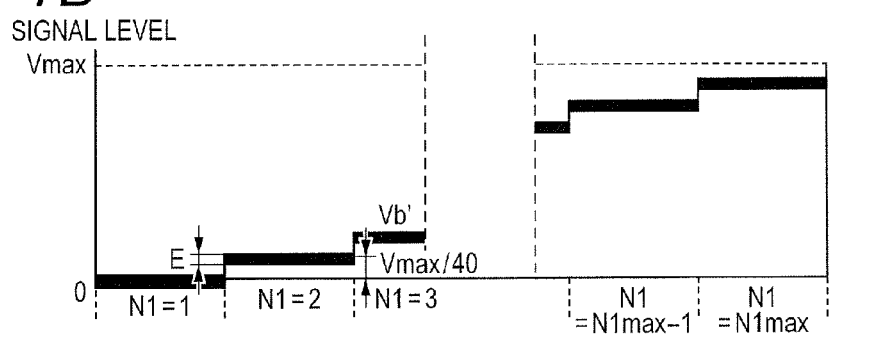
FIG. 7B is a graph showing a waveform change in synchronism calculation.

FIG. 7A shows waveforms of Inc1, Pv1, and Inc1/N1max. When a difference between the waveform of Pv1 and Inc1/N1max having the same gradient as Pv1 is taken, a step-like waveform containing the error component E shown in FIG. 7B is generated. A signal Vb' having the waveform shown in FIG. 7B is expressed by Expression (13). A signal level for one step of the step-like waveform is Vmax/N1max.

$$Vb' = Pv1 - (Inc1/N1max) \tag{13}$$

Figure 7C:
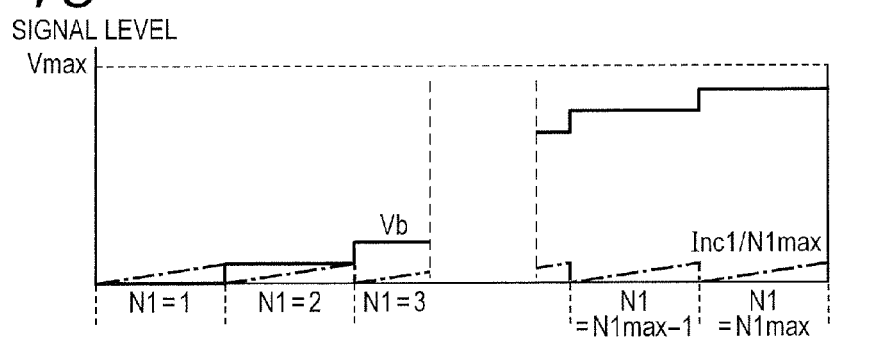
FIG. 7C is a graph showing a waveform change in synchronism calculation.

Next, the error component E of the waveform shown in FIG. 7B is removed by rounding. Then, a waveform shown in FIG. 7C is obtained. A signal Vb having the waveform shown in FIG. 7C is expressed by Expression (14).

$$Vb = Round[\{Pv1 - (Inc1/N1max)\} \times (N1max/Vmax)] \times (Vmax/N1max) \tag{14}$$

where Round[] is a function for rounding off the first decimal place.

The error component E can be expressed by Expression (15).

$$E = [Pv1 - (Inc1/N1max)] - Vb \tag{15}$$

Figure 7D:
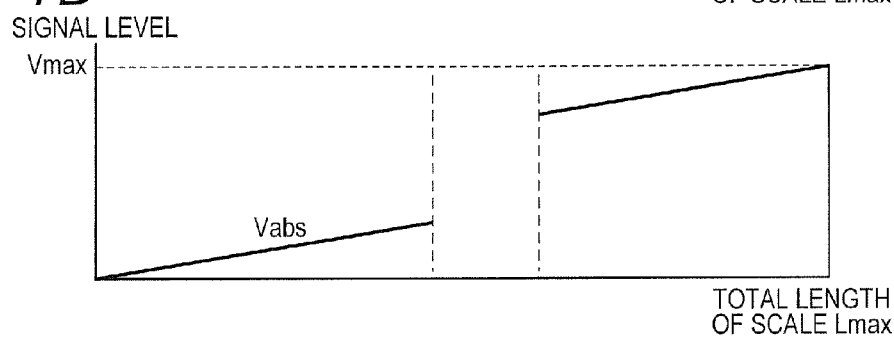
FIG. 7D is a graph showing a waveform change in synchronism calculation.

The waveform of Inc1/N1max is added to the waveform of the signal Vb shown in FIG. 7C to generate the signal Vabs indicating the absolute position obtained by removing the error component E, as shown in FIG. 7D.

The synchronism calculation is performed by a calculation expressed by Expression (16).

$$Vabs = Vb + (Inc1/N1max) \tag{16}$$

From the signal level Vabs indicating the absolute position, the absolute position value Pabs is expressed by Expression (17).

$$Pabs = Vabs \times (Lmax/Vmax) \tag{17}$$

After the absolute position value Pabs is calculated in Step S507, the processing proceeds to Step S508 and ends.

The absolute position value Pabs can be calculated as described above.

After she absolute position value Pabs is once obtained through the above-mentioned processing flow, in order to obtain a relative position, the ABS/INC calculator 102 instructs the scale switcher 103 to output the first A-phase displacement signal S1rA and the first B-phase displacement signal S1rB. In general, the relative position can be obtained, for example, by an incremental encoder or the like. In this case, the resolution is determined based on the fineness of a pulse to be generated (fineness of a read pattern). In the present invention, a phase in a pulse cycle can be obtained in addition to a pulse count through use of the first relative position signal Inc1 that is a periodic signal, and hence the position in a pulse cycle can also be specified. The ABS/INC calculator 102 calculates the first relative position signal Inc1 by the above-mentioned method based on the first A-phase displacement signal S1rA and the first B-phase displacement signal S1rB, and periodically calculates the relative position value Pinc based on the values of the relative position signal Inc1 and the first relative position signal Inc1 used in the calculation of the absolute position value Pabs in Expression (17). The relative position value Pinc that is a relative displacement amount based on the absolute position value Pabs is expressed by Expression (18).

$$Pinc = \{(Inc1\_current - Inc1\_base)/Vmax + N\_Inc1\} \times Lmax/N1max \tag{13}$$

where Inc1_base represents the first relative position signal Inc1 at a time of calculation of the absolute position value Pabs, Inc1_current represents the first relative position signal Inc1 at a time of calculation of the relative position; and N_Inc1 represents the accumulation of number of times by which the first relative position signal Inc1 is switched between Vmax and 0 (number of pulses) (note that, the number of times of switching from Vmax to 0 is defined to be positive, and the number of times of switching from 0 to Vmax is defined to be negative).

Accordingly, the ABS/INC calculator 102 always calculates the relative position value Pinc, except for the time period during which the absolute position value Pabs is calculated. Note that, in this embodiment, the calculation of the relative position value using the first relative position signal Inc1 has been described, but the present invention is not limited thereto. The relative position measured by any method can be applied to the present invention as long as the method is capable of measuring a known relative position.

Next, a method of determining an absolute position by the ABS determinator 101 is described.

Figure 8A:
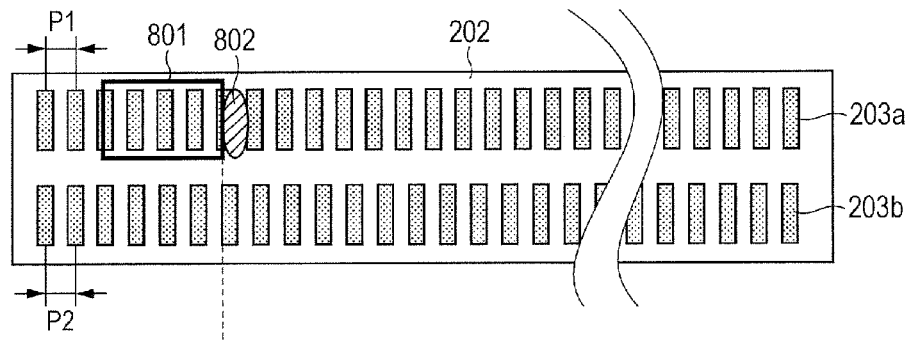
FIG. 8A is a diagram illustrating a foreign matter on a scale and a pattern read area.
Figure 8B:
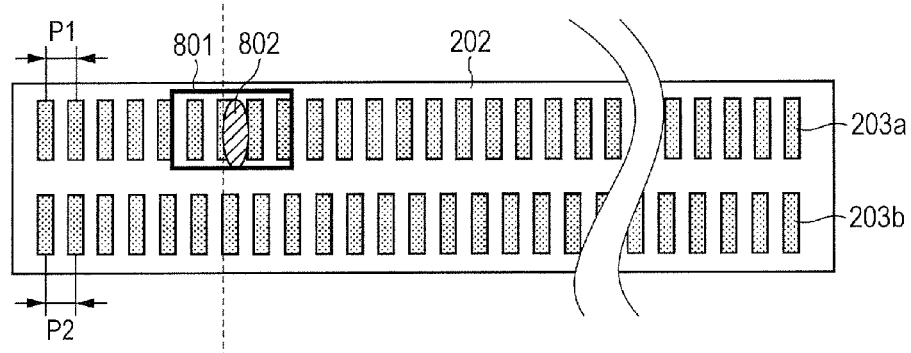
FIG. 8B is a diagram illustrating a foreign matter on a scale and a pattern read area.
Figure 8C:
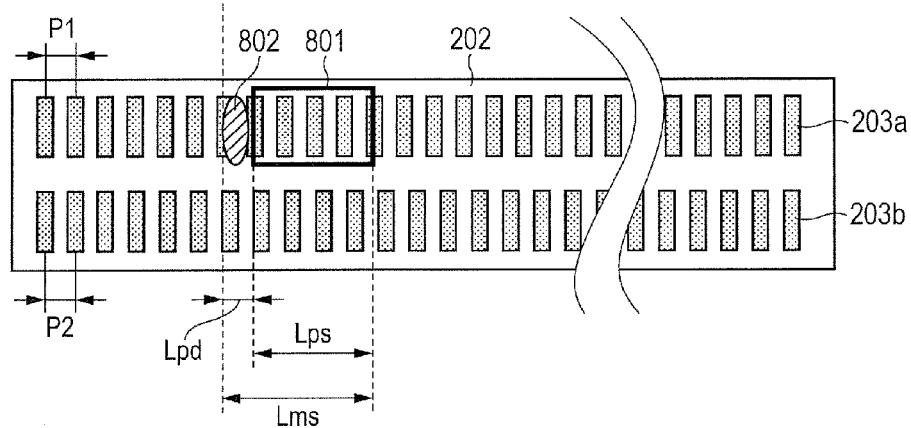
FIG. 8C is a diagram illustrating a foreign matter on a scale and a pattern read area.

FIGS. 8A, 8B, and 8C each illustrate a pattern read area 801 at a certain absolute position and the state of a foreign matter 802 on the scale unit 202 on a plan view of the scale unit 202 in this embodiment. In this embodiment, the pattern read area 801 corresponds to four cycles of the pattern of the pattern array 203*a*, and hence a width Lps of the pattern read area 801 in the X-direction is a length of P1×4. FIG. 8A illustrates the state in which the foreign matter 802 borders on the pattern read area 801 and the foreign matter 802 is not present in the pattern read area 801. FIG. 8B illustrates the state in which the foreign matter 802 is present in the pattern read area 801. FIG. 8C illustrates the state in which the foreign matter 802 borders on the pattern read area 801 on the opposite side of FIG. 8A and the foreign matter 802 is not present in the pattern read area 801. The movement amount of the pattern read area 801 of FIGS. 8A, 8B, and 8C is defined as Lms. In the case where the movable member 21 is movable in the X-direction, and the pattern read area 801 moves in the order of FIGS. 8A, 8B, and 8C, the light received by the light receiver 204*a* of FIG. 4 is influenced by the foreign matter 802 in the movement range of the movement amount Lms in the pattern read area 801. As a result, a signal in a correct pattern is not read, and a malfunction is caused in which the absolute position value Pabs cannot be calculated correctly. In this case, when the width of the foreign matter 802 in the X-axis direction (length of an error occurring range in the movement direction) is defined, as Lpd, the movement amount Lms is expressed by Expression (19).

$$Lms=Lps+Lpd \quad (19)$$

Thus, in the case where the foreign matter 802 is present at any position in the pattern read area 801 at a certain absolute position, the foreign matter 802 is not present in the pattern read area 801 at the absolute position moved by the movement amount Lms or more. That is, the absolute position value Pabs at any one of the two absolute positions that are away from each other by the movement amount Lms or more is not influenced by the foreign matter 802, and thus the correct absolute position value Pabs is calculated.

In this case, when the width of an allowable foreign matter in the X-axis direction is defined as Lpdmax, a minimum movement amount (error recovering displacement amount) Lmsmin required for moving the absolute position to a position that is not influenced by the foreign matter 802 without fail can be set by Expression (20).

$$Lmsmin=Lps+Lpdmax \quad (20)$$

The maximum value Lpdmax of the width of the allowable foreign matter in the X-axis direction is determined in advance based on the size of the maximum foreign matter to be mixed during the manufacturing of an absolute encoder, and the minimum movement amount Lmsmin corresponding thereto is held by the ABS determinator 101.

Accordingly, if the difference between the absolute position values (first temporal position and second temporal position) Pabs and the difference (displacement amount) between the relative position values Pinc at two positions that are away from each other by the minimum movement amount Lmsmin are matched with each other, it can be determined that any absolute position value Pabs at two absolute positions is calculated correctly. Further, if the difference between the absolute position values Pabs (first temporal position and second temporal position) and the difference (displacement amount) between the relative position values Pinc at certain two positions are not matched with each other (in other words, if it is determined they are different from each other), the absolute position value Pabs (third temporal position) is calculated at a position away from any one of the two positions by the minimum movement amount Lmsmin or more. It can be determined that the absolute position values Pabs at two positions where the difference between the absolute position values Pabs (temporal positions) and the difference (displacement amount) between the relative position values Fine among combinations of the three absolute positions are matched with each other are both calculated correctly.

FIG. 9 illustrates a flow of absolute position determination in this embodiment.

The absolute position value is determined by the ABS determinator 101.

In Step S901, processing starts and then proceeds to Step S902.

In Step S902, a relative position value Pincc is initialized, and the processing proceeds to Step S903. In the following, the absolute position in Step S902 is defined as an initial position of a relative position, and the relative position value Pincc is updated as a relative position displacement amount from the initial position. The processing proceeds to Step S903.

In Step S903, the present relative position value Pincc is held as a relative position value Pinc1 at a present position (position 1), and the processing proceeds to Step S904.

In Step S904, the absolute position value Pabs at the present position (position 1) is calculated, and the calculated absolute position value Pans is held as an absolute position value Pabs1. Then, the processing proceeds to Step S906.

In Step S905, the relative position value Pincc at the present position is updated, and the processing proceeds to Step S906.

In Step S906, when it is determined based on the updated relative position value Pincc that the movable member has not moved from the position 1 or an absolute position value Pabsc calculation position (described later) by a predetermined movement amount Mpb, the processing returns to Step S905, and otherwise, the processing proceeds to Step S907. In this case, the predetermined movement amount Mpb is any value equal to or less than the minimum movement amount Lmsmin.

In Step S907, the absolute position value Pabs at the present position is calculated, and the calculated absolute position value Pabs is held as an absolute position value Pabsc'. Then, the processing proceeds to Step S908.

In Step S908, when the difference between the absolute position value Pabsc' at the present position and the absolute position value Pabs1 at the position 1 is matched with the difference between the relative position value Pincc at the present position and the relative position value Pinc1 at the position 1, the processing proceeds to Step S909, and otherwise, the processing proceeds to Step S911.

In this case, when the difference between the absolute position values and the difference between the relative position values are not matched with each other, it can be determined that an error has occurred in the calculation of the absolute position value at any one of the present position and the position 1. That is, it can be determined that the foreign matter 802 is present somewhere in the pattern read area 801 at the present position or in the pattern read area 801 at the position 1.

In Step S909, it is determined based on the relative position value Pincc whether or not the present position has moved from the position 1 by the minimum movement amount Lmsmin or more. When the present position has moved by the minimum movement amount Lmsmin or more, the processing proceeds to Step S910. When the present position has not moved by the minimum movement amount Lmsmin or more, the processing returns to Step S905.

In Step S910, the absolute position value Pabsc' is determined as a reference absolute position value Pabsb because an error has not been detected in the absolute position value Pabs even when the present position has moved by the minimum movement amount Lmsmin or more. Further, the present relative position value Pincc is held as a reference relative position value Pincb, and the processing proceeds to Step S916 and ends.

In Step S911 branched from Step S908, the relative position value Piece at the present position is held as a relative position value Pinc1 at the position 2. Further, the absolute position value Pabsc' at the present position is held as an absolute position value Pabs2 at the position 2, and the processing proceeds to Step S912.

In Step S912, the relative position value Pincc at the present position is updated, and the processing proceeds to Step S913.

In Step S913, the processing proceeds to Step S914 when the difference between the relative position value Pincc and the relative position value Pinc1 is equal to or more than the minimum movement amount Lmsmin and the difference between the relative position value Pincc and the relative position value Pinc1 is equal to or more than the minimum movement amount Lmsmin. When the difference between the relative position value Pincc and the relative position value Pinc1 is equal to or more than the minimum movement amount Lmsmin and the difference between the relative position value Pincc and the relative position value Pinc2 is not equal to or more than the minimum movement amount Lmsmin, the processing returns to Step S912.

In Step S914, the absolute position value Pabs at the present position is calculated, and the calculated absolute position value Pabs is held as the absolute position value Pabsc'. Then, the processing proceeds to Step S915.

In Step S915, it is determined that the present position has moved from the error occurring position by the minimum movement amount Lmsmin or more and is not influenced by the foreign matter 802 based on the pattern read area 801, and the absolute position value Pabsc' is determined as the reference absolute position value Pabsb. Then, the processing proceeds to Step S916.

When the processing proceeds to Step S916, the processing ends.

After that, the present absolute position value Pabsc is determined based on the reference absolute position value Pabsb, the reference relative position value Pincb, and the present relative position value Pincc. The present absolute position value Pabsc is expressed by Expression (21).

$$Pabsc=Pabsb+(Pincc-Pincb) \quad (21)$$

In the position detecting apparatus of this embodiment, when the movable member is moved by a slight amount by any operation immediately after the start-up of the apparatus, an absolute position is determined naturally at that time point.

In this embodiment, in the case where the absolute position value is not matched with the relative position value, the absolute position value Pabs at the absolute position moved by the minimum movement amount Lmsmin or more is determined as the reference absolute position value Pabsb.

However, another method may be used. That is, the mismatch between the absolute position value and the relative position value is checked again, and, when the mismatch occurs, the reference absolute position value Pabsb is not determined until the absolute position value and the relative position value are matched with each other.

Further, the following may also be performed. The absolute position values and the relative position values at a plurality of absolute positions away from each other by the minimum movement amount Lmsmin or more are recorded, and the reference absolute position value may be determined based on the absolute position value at which the match occurs often based on the relationship between the absolute position values and the relative position values at the plurality of absolute positions.

Accordingly, even in the case where motes and scratches are present on the scale in the Vernier type absolute encoder, an absolute position having high reliability can be calculated while erroneous absolute position calculation is prevented.

Further, in this embodiment, an optical encoder has been described. However, the present invention is not limited thereto, and even in a magnetic or electrostatic absolute encoder, the similar effects can be exhibited to those giving external disturbance to the detection of a periodic signal due to defects or the like on the scale in which a periodic pattern is formed in the movement direction.

Second Embodiment

Next, a second embodiment of the present invention is described with reference to FIG. 10.

Figure 10:
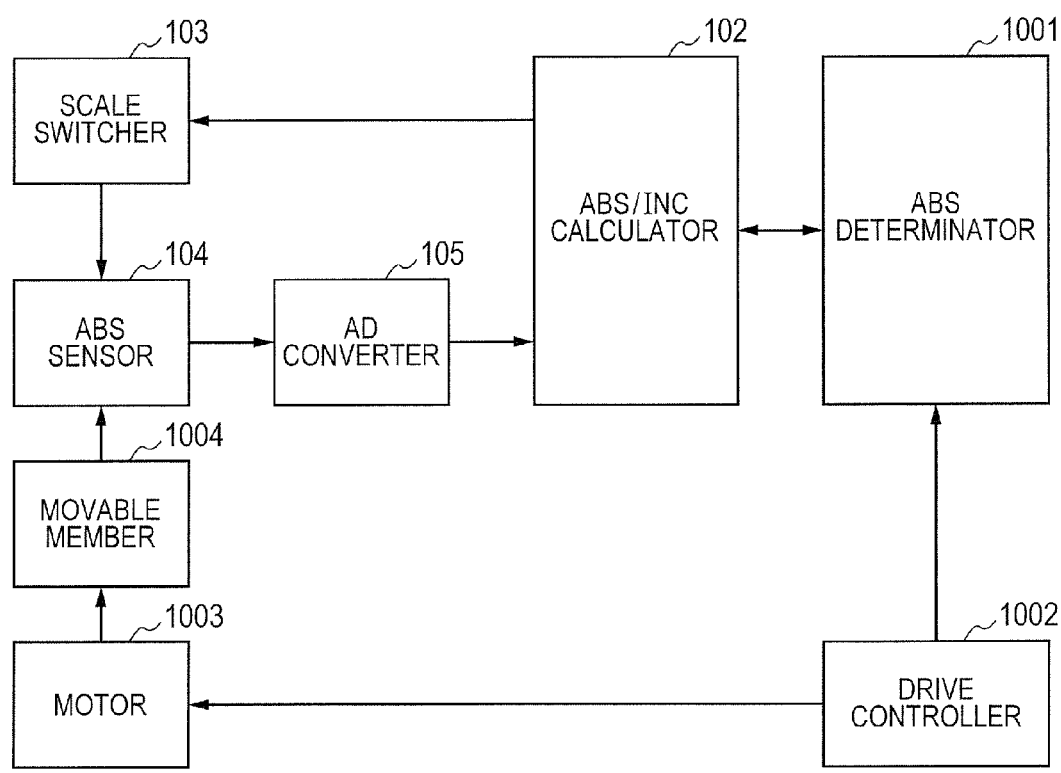
FIG. 10 is a configuration block diagram according to a second embodiment of the present invention.

FIG. 10 is a configuration block diagram of this embodiment, and the same configuration as that of FIG. 1 is denoted by the same reference numeral.

An ABS determinator 1001 is an absolute position determinator for determining the present absolute position Pabsc based on the absolute position value Pabs and the relative position value Pinc calculated by the ABS/INC calculator 102, and is different in operation from the ABS determinator 101 described in the first embodiment. A drive controller 1002 is configured to drive and control a movable member 1004. A motor 1003 is configured to drive the movable member 1004, and examples thereof include a DC motor and a stepping motor. The movable member 1004 is subjected to absolute position detection by the ABS sensor 104.

Next, the operation of this embodiment is described.

Figure 11:
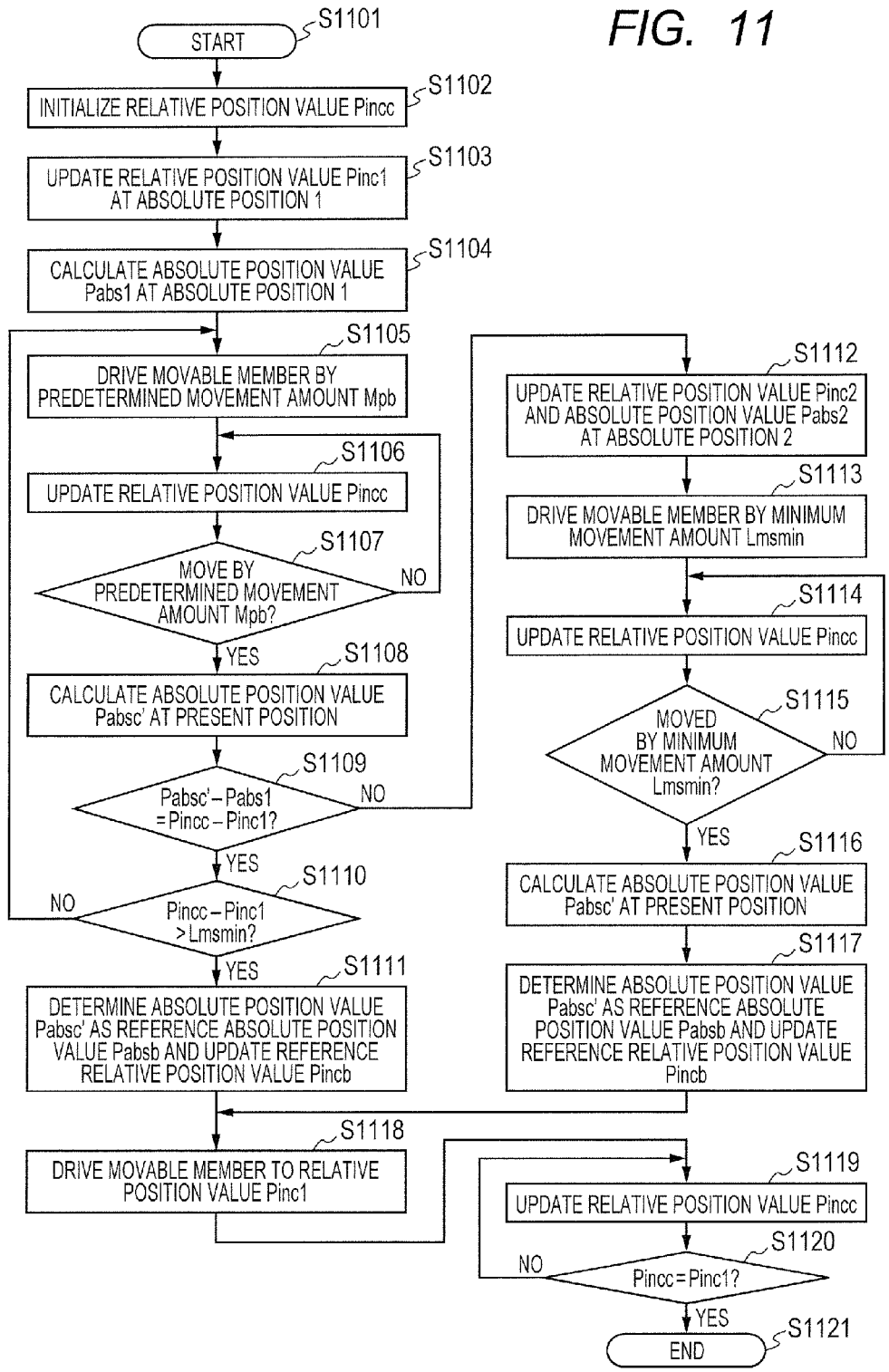
FIG. 11 is a flowchart of absolute position determination according to the second embodiment.

FIG. 11 illustrates a flow of absolute position determination in this embodiment.

The absolute position value is determined by the ABS determinator 1001.

In Step S1101, processing starts and then proceeds to Step S1102.

In Step S1102, the relative position value Pincc is initialized, and the processing proceeds to Step S1103, In the following, the absolute position in Step S1102 is defined as an initial position of a relative position, and the relative position value Pincc is updated as a relative position displacement amount from the initial position.

In Step S1103, the present relative position value Pincc is held as the relative position value Pinc1 at the present position (position 1), and the processing proceeds to Step S1104.

In Step S1104, the absolute position value Pabs at the present position (position 1) is calculated. The calculated absolute position value Pabs is held as the absolute position value Pabs1, and the processing proceeds to Step S1105.

In Step S1105, the ABS de terminator 1001 instructs the drive-controller 1002 to drive the movable member 1004 by a predetermined movement amount Mpb, and the processing proceeds to Step S1106. In this case, the predetermined movement amount Mpb is any value equal to or less than the minimum movement amount Lmsmin. The drive controller 1002 controls the motor 1003 in accordance with the instruction and drives the movable member 1004. The ABS sensor 104 outputs a signal corresponding to the position of the movable member 1004 to the AD converter 105 in accordance with the drive of the movable member 1004.

In Step S1106, the relative position value Pincc at the present position is updated, and the processing proceeds to Step S1107.

In Step S1107, when it is determined based on the updated relative position value Pincc that the movable member has not moved from the position 1 or an absolute position value Pabsc calculation position (described later) by the predetermined movement amount Mpb, the processing returns to Step S1106, and otherwise, the processing proceeds to Step S1108.

In Step S1108, the absolute position value Pabs at the present position is calculated. The calculated absolute position value Pabs is held as the absolute position value Pabsc'. Then, the processing proceeds to Step S1109.

In Step S1109, when the difference between the absolute position value Pabsc' at the present position and the absolute position value Pabs1 at the position 1 is matched with the difference between the relative position value Pincc at the present position and the relative position value Pinc1 at the position 1, the processing proceeds to Step S1110, and otherwise, the processing proceeds to Step S1112.

In Step S1110, it is determined based on the relative position value Pincc whether or not the present position has moved from the position 1 by the minimum movement amount Lmsmin or snore. When the present position has moved by the minimum movement amount Lmsmin or more, the processing proceeds to Step S1111. When the present position has not moved by the minimum movement amount Lmsmin or more, the processing returns to Step S1105.

In Step S1111, the absolute position value Pabsc' is determined as the reference absolute position value Pabsb because an error has not been detected in the absolute position value Pabs even when the present position has moved by the minimum movement amount Lmsmin or more. Further, the present relative position value Pincc is held as the reference relative position value Pincb, and the processing proceeds to Step S1118.

In Step S1112, the relative position value Pincc at the present position is held as the relative position value Pinc2 at the position 2. Further, the absolute position value Pabsc' at the present position is held as the absolute position value Pabs2 at the position 2, and the processing proceeds to Step S1113.

In step S1113, the ABS determinator 1001 instructs the drive controller 1002 to drive the movable member 1004 by the minimum movement amount Lmsmin, and the processing proceeds to Step S1114.

In Step S1114, the relative position value Pincc at the present position is updated, and the processing proceeds to Step S1115.

In Step S1115, when the difference between the relative position value Pincc and the relative position value Pinc1 is equal to or more than the minimum movement amount Lmsmin and the difference between the relative position value Pincc and the relative position value Pinc2 is equal to or more than the minimum movement amount Lmsmin, the processing proceeds to Step S1116. The difference between the relative position value Pincc and the relative position value Pinc1 is equal to or more than the minimum movement amount Lmsmin and the difference between the relative position value Pincc and the relative position value Pinc2 is not equal to or more than the minimum movement amount Lmsmin, the processing returns to Step S1114.

In Step S1116, the absolute position value Pabs at the present position is calculated. The calculated absolute position value Pabs is held as the absolute position value Pabsc'. Then, the processing proceeds to Step S1117.

In Step S1117, it is determined that the present position has moved from the error occurring position by the minimum movement amount Lmsmin or more and is not influenced by the foreign matter 802 based on the pattern read area 801, and the absolute position value Pabsc' is determined as the reference absolute position value Pabsb. Then, the processing proceeds to Step S1118.

In Step S1118, the ABS determinator 1001 instructs the drive controller 1002 to drive the movable member 1004 to the relative position value Pinc1 that is the initial position, and the processing proceeds to Stop S1119.

In Step S1119, the relative position value Pincc at the present position is updated, and the processing proceeds to Step S1120.

In Step S1120, when the relative position value Pincc is matched with the relative position value Pinc1, the processing proceeds to Step S1121 and ends. When the relative position value Pincc is not matched with the relative position value Pinc1, the processing returns to Step S1119.

After that, by the same method as that of the first embodiment, the present absolute position value Pabsc is determined based on the reference absolute position value Pabsb, the reference relative position value Pincb, and the present relative position value Pincc.

In the above-mentioned processing flow, the absolute position is determined at a time of proceeding to Step S1118. In this embodiment, the movable member 1004 is forcedly moved so as to determine the absolute position, and hence the processing from Step S1118 to Step S1120 is the processing for returning to the state before the start of the processing flow. A unit for storing the relative position value immediately after the start of the processing flow of FIG. 11 may be provided for the above-mentioned purpose. In this embodiment, in the case where the absolute position value is not matched with the relative position value, the absolute position value Pabs at the absolute position moved by the minimum movement amount Lmsmin or more is determined as the reference absolute position value Pabsb.

However, another method may be used. That is, the mismatch between the absolute position value and the relative position value is checked again, and, when the mismatch occurs, the movable member 1004 is driven by the minimum movement amount Lmsmin or more again, and the reference absolute position Pabsb is not determined until the absolute position value and the relative position value are matched with each other.

Further, the following may also be performed. The movable member 1004 is driven to a plurality of positions that are away from each other by the minimum movement amount Lmsmin or more, and the absolute position value and the relative position value at each position are calculated. After that, a reference absolute position value may be determined based on the absolute position value at which the match occurs often based on the relationship between the absolute position values and the relative position values at the plurality of absolute positions.

Accordingly, even in the case where motes and scratches are present on the scale in the Vernier type absolute encoder, an absolute position having high reliability can be calculated while erroneous absolute position calculation is prevented through the minimum drive at the time of the initial start-up.

Further, in the above-mentioned embodiment, the use of an optical encoder has been exemplified. However, the present invention is not limited thereto, and a magnetic or electrostatic absolute encoder may be used.

A lens apparatus capable of exhibiting the effect of the present invention can be realized by applying the position detecting apparatus of the embodiments to a lens apparatus including a movable optical member so as to detect the position of the movable optical member. Further, an image pickup apparatus capable of exhibiting the effect of the present invention can be realized by applying the position detecting apparatus of the embodiments to an image pickup apparatus including a lens apparatus including a movable optical member and a camera apparatus so as to detect the position of the movable optical member.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or mere circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-224847, filed Oct. 30, 2013, which is hereby incorporated by reference herein in its entirety.

What is claimed is:

1. A position detecting apparatus, comprising:
   a seals comprising a plurality of pattern arrays formed in different cycles in a movement direction;
   an obtaining unit configured to obtain a plurality of signals in accordance with the plurality of pattern arrays;
   a first deriving unit configured to derive a temporal position of the scale with respect to the obtaining unit, based on the plurality of signals;
   a second deriving unit configured to derive a displacement amount of the scale with respect to the obtaining unit based on one or more signals of the plurality of signals; and
   a determinator configured to determine a determined position of the scale with respect to the obtaining unit based on the temporal position and the displacement amount,
   wherein the determinator determines the determined position based on a result of comparison between a difference between a first temporal position calculated by the first deriving unit at a first position and a second temporal position calculated by the first deriving unit at a second position and a displacement amount derived by the second deriving unit from the first position to the second position.

2. A position detecting apparatus according to claim 1, wherein, when the determinator determines that the difference and the displacement amount are different from each other, there is an error in any one of the first absolute position value and the second absolute position value based on the first absolute position value, the second absolute position value, and the displacement amount calculated by the relative position calculator from the first position to the second position, the determinator determines she determined position based on a third temporal position derived by the first deriving unit at a third position that is different from the first position and the second position, the first temporal position, the second temporal position, and the displacement amount between any two positions of the first position, the second position, and the third position calculated by the second deriving unit.

3. A position detecting apparatus according to claim 1, wherein the error amount is larger than a predetermined value which is set based on a length of the scale in the movement direction in which the obtaining unit is capable of obtaining the plurality of signals simultaneously.

4. A position detecting apparatus according to claim 1, wherein the error amount is larger than a predetermined value which is set based on a length of a predefined error occurring range in the movement direction on the scale.

5. A position detecting apparatus according to claim 1, further comprising a controller configured to control drive of the scale in the movement direction with respect to the obtaining unit,
   wherein the controller drives the scale in the movement direction until the determinator determines the determined position.

6. A position detecting apparatus according to claim 5, further comprising a unit configured to store the displacement amount derived by the second deriving unit at a time when the determinator starts processing of determining the determined position,
   wherein the controller drives the scale up to a position corresponding to the stored displacement amount after the determinator determines the determined position.

7. A position detecting apparatus according to claim 1, wherein the plurality of pattern arrays comprises a plurality of reflective pattern arrays, and
   wherein the obtaining unit comprises a light source and a plurality of light receivers configured to receive each light emitted from the light source and reflected by the plurality of reflective pattern arrays.

8. A lens apparatus, comprising:
   a movable optical member; and a position detecting apparatus serving as a position detecting apparatus for the movable optical member, the position detecting apparatus, comprising:

a scale comprising a plurality of pattern arrays formed in different cycles in a movement direction;

an obtaining unit configured to obtain a plurality of signals in accordance with the plurality of pattern arrays;

a first deriving unit configured to derive a temporal position of the scale with respect to the obtaining, based on the plurality of signals;

a second deriving unit configured to derive a displacement amount of the scale with respect to the obtaining unit based on one or more signals of the plurality of signals; and a determinator configured to determine a determined position of the scale with respect to the obtaining unit based on the temporal position and the displacement amount, wherein the determinator determines the determined position based on a result of comparison between a difference between a first temporal position calculated by the first deriving unit at a first position and a second temporal position calculated by the first deriving unit at a second position and a displacement amount derived by the second deriving unit from the first position to the second position.

9. An image pickup apparatus, comprising:

a lens apparatus comprising;
 a movable optical member; and
 a position detecting apparatus serving as a position detecting apparatus for the movable optical member, the position detecting apparatus, comprising:

a scale comprising a plurality of pattern arrays formed in different cycles in a movement direction;

an obtaining unit configured to obtain a plurality of signals in accordance with the plurality of pattern arrays;

a first deriving unit configured to derive a temporal position of the scale with respect to the obtaining unit, based on the plurality of signals;

a second deriving unit configured to derive a displacement amount of the scale with respect to the obtaining unit based on one or more signals of the plurality of signals; and a determinator configured to determine a determined position of the scale with respect to the obtaining unit based on the temporal position and the displacement amount, wherein the determinator determines the determined position based on a result of comparison between a difference between a first temporal position calculated by the first deriving unit at a first position and a second temporal position calculated by the first deriving unit at a second position and a displacement amount derived by the second deriving unit from the first position to the second position; and a camera apparatus.

* * * * *